United States Patent [19]

Wittenstein et al.

[11] 4,245,144
[45] Jan. 13, 1981

[54] SPARK-MACHINING APPARATUS

[75] Inventors: Horst Wittenstein; Harry Neumann; Günter Peddinghaus, all of Ennepetal, Fed. Rep. of Germany

[73] Assignee: Carl Dan. Peddinghaus, GmbH & Co. KG, Ennepetal, Fed. Rep. of Germany

[21] Appl. No.: 912,415

[22] Filed: Jun. 5, 1978

[30] Foreign Application Priority Data

Sep. 27, 1977 [DE] Fed. Rep. of Germany ....... 2743275

[51] Int. Cl.³ .............................................. B23P 1/12
[52] U.S. Cl. ................................ 219/69 E; 219/69 D
[58] Field of Search ................ 219/69 M, 69 V, 69 E, 219/69 R, 69 D

[56] References Cited

U.S. PATENT DOCUMENTS

| 2,909,641 | 10/1959 | Kucyn | 219/69 E |
| 3,783,224 | 1/1974 | Schroeder | 219/69 E |

FOREIGN PATENT DOCUMENTS 187501 11/1966 U.S.S.R. ............................... 219/69 E

Primary Examiner—C. C. Shaw
Attorney, Agent, or Firm—H. Dale Palmatier

[57] ABSTRACT

An electrode mounting plate having a flat face adhesively bonded to a graphite electrode and an opposite face forming a trough with reinforcing ribs, the trough being covered in use by the mounting plate of the spark machining apparatus to define a chamber communicating with the dielectric circulation system of the apparatus. Flow passages for the dielectric fluid are formed by drilling holes through the mounted electrode and the flat face of the electrode mounting plate.

1 Claim, 2 Drawing Figures

U.S. Patent

Jan. 13, 1981

4,245,144

SPARK-MACHINING APPARATUS

This invention relates to improvements in or relating to spark-machining apparatus.

In a spark-machining apparatus used in Germany it is known to flood the operating gap between a graphite electrode and a work-piece with liquid dielectric in order to flush away particles eroded by the arc. For this purpose, rinsing bores are bored through the graphite electrode to meet rinsing channels connected in a dielectric circulation system. This operation is difficult for complicated electrode shapes and, depending on the size and length of the channels, may fail to provide uniform rinsing. The result of non-uniform rinsing is that, in inadequately rinsed areas, breaks in contact occur during erosion and necessitate subsequent hand-machining.

It is an object of the invention to provide a means for improving the dielectric rinsing of spark-machining apparatus.

The present invention provides an electrode mounting plate for mounting a graphite electrode in spark-machining apparatus, the plate having one face arranged to mount a graphite electrode, and an opposite face arranged to define a chamber which can be connected to a dielectric circulation system of said spark-machining apparatus.

Figure 1:
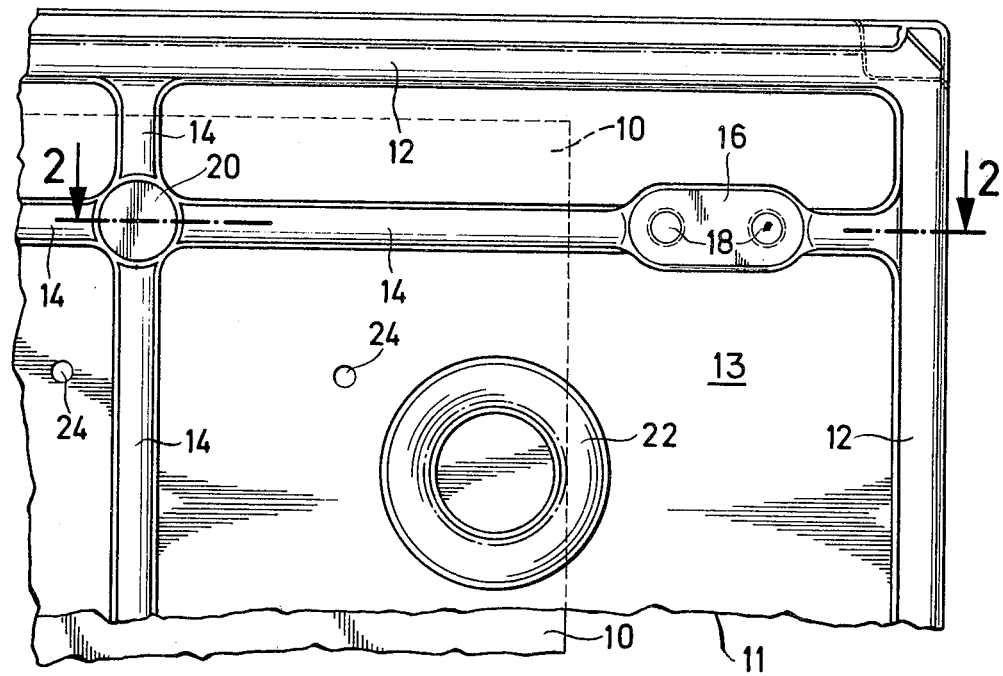
Figure 2:
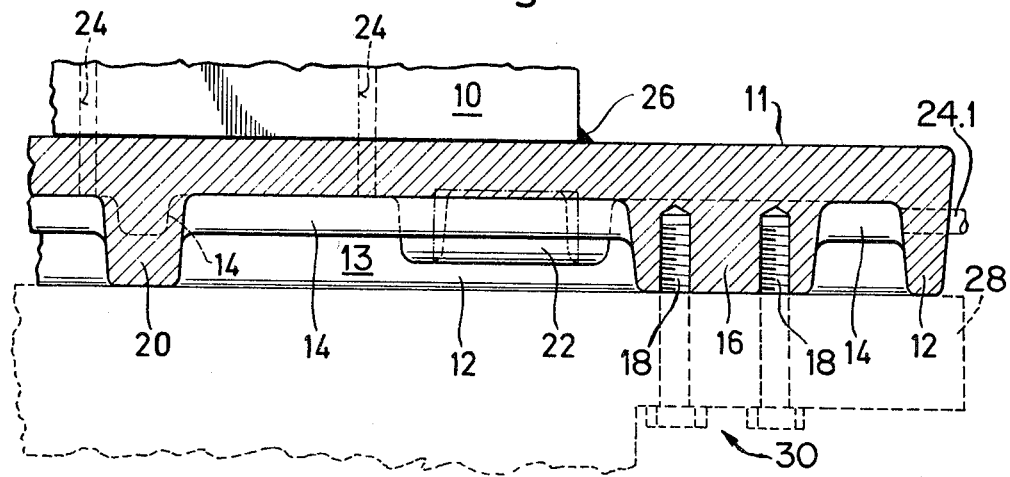

By way of example only an illustrative embodiment of the invention will now be described with reference to the accompanying drawing, in which:

FIG. 1 shows an electrode mounting plate embodying the invention and seen from the rear—that is the side remote from the electrode, and FIG. 2 is a section along the line 2—2 of FIG. 1, viewed in the direction of the arrow.

Referring to the drawing, an electrode mounting plate 11 is shown for use in mounting a graphite electrode of a spark-machining apparatus. Such a graphite electrode is indicated by the broken outline in FIG. 1 and is partially illustrated in FIG. 2, reference 10 indicating the graphite electrode.

The operating gap between the electrode and a workpiece (which will usually be of ferrous metal) is flooded in use with a liquid dielectric in order to rinse away the ferrous particles eroded by the arcing. To achieve this the electrode 10 is provided with rinsing bores 24 which are connected to a dielectric circulation system. The electrode mounting plate 11 is itself carried by a electrode assembly mounting plate 23 located on the electrode feed shaft of the spark machining apparatus indicated in general by numeral 30. The side of the electrode mounting plate 11 remote from the electrode defines a trough 13 which is covered over in use by the electrode assembly mounting plate 28 to define a chamber for the liquid dielectric.

On the side remote from the graphite block 10 (FIG. 2) the electrode mounting plate has a peripheral flange or wall 12, so that the plate seen from this side is in the shape of a flat trough defining a shallow chamber 13. Reinforcing a ribs 14 are provided cross-wise on the inside of the trough, which trough defines the dielectric chamber. Bosses 16 are provided in the ribs 14, the tops of the bosses being flush with the distal edge of the flange 12. Tapped blind holes 18 are provided in the bosses 16 to enable the electrode mounting plate 11 to be itself mounted in the spark-machining apparatus 30. In addition, bosses 20, likewise having tops flush with the flange, are provided at the points of intersection of ribs 14. A circular, crater-like boss 22, not projecting so far as to be flush with the flange is provided to receive a centering ring (not shown), by means of which the electrode mounting plate 11 is positioned on its own mounting 28.

It can be seen that practically the entire rear surface of the electrode mounting plate—with the exception of the bosses—can be flooded with dielectric, so that it is possible at any position to sink bores 24 through the electrode 10 and through the plate surface. The electrode itself, as shown by 26, is cemented onto the plate 11 for which graphite adhesives, which are obtainable commercially, are used.

Thus, the rinsing bores 24 in the electrode 10 can be bored with ease in a perpendicular direction and through the face of the electrode mounting the plate 13 so that uniform rinsing and therefore better eroding efficiency on the workpiece can be achieved.

A brief summary of what has been described will now be given.

Electrode plate 11 for chucking graphite electrodes for the electroerosive machining of workpieces, in which the operating gap between electrode and workpiece is flooded by a liquid dielectric, wherein there is incorporated into the rear of the plate remote from the electrode a chamber which can be connected to the dielectric circulation and which extends substantially over the entire extent of the plate.

The plate, viewed from the rear, is in the form of a trough with reinforcing ribs spanning the interior of the trough.

What we claim is:

1. A mounting plate for carrying a graphite electrode on the electrode assembly mounting plate in a spark machining apparatus, comprising a broad and generally flat plate with rinsing bores therethrough and having opposite faces and a periphery, one face being flat for securing the graphite electrode thereto, the other face having walls, ribs and bosses protruding therefrom, the walls extending around the periphery of the plate to engage the electrode assembly mounting plate and embrace a chamber for dielectric fluid adjacent the other face, the ribs traversing the chamber in multiple directions and extending to the walls, and the ribs having a height from said other face less than the height of the walls and thereby permitting free flow of the dielectric fluid within the chamber, and the bosses having a height from said other face identical to the height of the walls to lie flush therewith and to engage the electrode assembly mounting plate of the spark machining apparatus, certain of the bosses having tapped apertures therein and normal to the plate.

* * * * *